United States Patent [19]

Bridigum

[11] 4,037,880

[45] July 26, 1977

[54] EMERGENCY BRAKE VALVE DEVICE FOR PROPOGATING AN EMERGENCY BRAKE APPLICATION

[75] Inventor: Robert J. Bridigum, Plum Borough, Pa.

[73] Assignee: Westinghouse Air Brake Company, Wilmerding, Pa.

[21] Appl. No.: 700,399

[22] Filed: June 28, 1976

[51] Int. Cl.² .................................. B60T 17/04
[52] U.S. Cl. ........................... 303/82; 137/495
[58] Field of Search ............ 303/3, 36, 37, 69, 82; 137/495

[56] References Cited

U.S. PATENT DOCUMENTS

| | | | |
|---|---|---|---|
| 2,693,813 | 11/1950 | Tucker | 137/495 X |
| 3,165,115 | 1/1965 | Erson | 303/82 X |
| 3,378,311 | 4/1968 | Wright, Jr. | 303/69 |

Primary Examiner—George E. A. Haluosa
Attorney, Agent, or Firm—R. S. Visk; R. W. McIntire, Jr.

[57] ABSTRACT

An emergency brake valve device, especially for rapid transit railway vehicles, in which a vent valve for propogating transmission of an emergency rate reduction of brake pipe pressure is opened by direct engagement thereof by a brake pipe pressure reduction rate sensitive piston subjected unrestrictedly to brake pipe pressure on one side and to control brake pipe pressure communicated to the opposite side via a choke. A magnet valve device connected to brake pipe pressure on the one side of the rate sensitive piston provides for electrically initiating reduction of the brake pipe at an emergency rate and, consequently, an emergency brake application.

5 Claims, 4 Drawing Figures

EMERGENCY BRAKE VALVE DEVICE FOR PROPOGATING AN EMERGENCY BRAKE APPLICATION

BACKGROUND OF THE INVENTION

As railway braking equipment becomes more operably sophistocated, the structure thereof becomes more intricate and complex, and, therefore, the cost of manufacturing such equipment increases accordingly. In order to reduce the cost of manufacturing railway braking equipment, it has become necessary to make special efforts to simplify the structure of such equipment while retaining the functional aspects and efficiency of the more costly equipment.

SUMMARY OF THE INVENTION

The object of the present invention, therefore, is to provide an emergency brake valve device, especially for rapid transit railway vehicles, characterized by simplification of structure yet capable of performing similar functions and in similarly efficient manner of presently known emergency brake valve devices used for propogating an emergency brake application on the train.

Briefly, the invention comprises an emergency brake valve device connected to a brake pipe and including a vent valve for propogating transmission throughout the train of brake pipe pressure reduction at an emergency rate when said vent valve is opened by direct engagement by a reduction-rate sensitive piston subjected unrestrictedly on one side to brake pipe pressure and on the other side to the same brake pipe pressure but through a choke, so that in the event of a brake pipe pressure reduction at an emergency rate, the resulting differential established across the rate sensitive piston causes movement and engagement thereof with the vent valve. A magnetic valve device may be connected to the one side of the rate sensitive piston for venting brake pipe pressure acting on said one side when said magnet valve is energized thereby providing means for electrically initiating and propogating an emergency brake application.

DESCRIPTION & OPERATION

Figure 1:
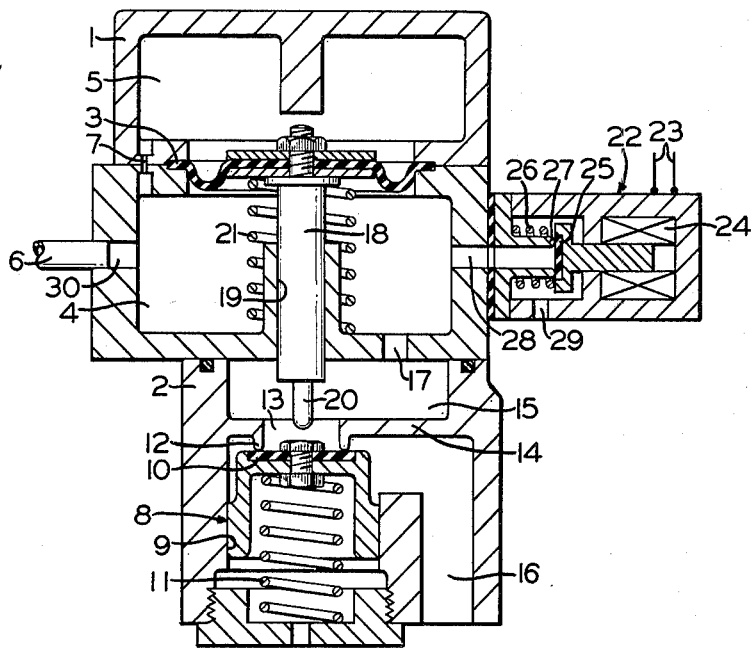
FIG. 1 is an elevational view, in section, of an emergency brake valve device embodying the invention.

As shown in FIG. 1, the emergency brake valve device embodying the invention comprises a double section piston-housing portion 1 and a valve-housing portion 2 sealingly secured to and underneath the piston-housing portion by suitable means not shown.

A diaphragm type piston 3 is peripherally sealingly secured between the two sections of housing portion 1 so as to be reciprocably operable therein and divides said housing portion into a brake pipe pressure chamber 4 adjacent the lower side of said piston and an equalizing chamber 5 adjacent the upper side of said piston. Pressure chamber 4 is connected to a brake pipe 6, while equalizing chamber 5 is connected to said pressure chamber via a choke 7.

A vent valve member 8 is operably disposed in a bore 9 in valve-housing portion 2 in axial alignment with piston 3, said valve member carrying on the upper end thereof a valve element 10 urged by a spring 11 into a seated or closed position relative to a valve seat 12 surrounding an exhaust port 13 formed in a separating wall 14 in said valve-housing portion. Valve element 10, in cooperation with valve seat 12, controls communication, via port 13, between an exhaust chamber 15 and an exhaust passageway 16 open to atmosphere. Exhaust chamber 15 is formed cooperatively by separating wall 14 and housing portions 1 and 2, and is constantly in communication with pressure chamber 4 via a connecting port 17 formed in housing portion 1.

Piston 3 is provided with a piston stem 18 extending coaxially from the lower side thereof through equalizing chamber 4 and slidably coaxially through a guide bore 19 formed in housing portion 1, said stem extending into exhaust chamber 15 in axial alignment with valve member 8 and having a contact finger 20 formed on the free end thereof. A return spring 21 compressedly disposed in pressure chamber 4 urges piston 3, stem 18, and finger 20, as a unit, upwardly as viewed in the drawing, toward a normal retracted position in which said finger is out of contact with valve member 8, which, in turn, occupies its seated position on valve seat 12.

Upon downward unitary movement of piston 3, stem 18 and finger 20 to an extended or vent position, as effected in a manner to be hereinafter described, said contact finger engages and causes downward movement of valve member 8 to a vent position in which valve 10 is operated to an open or unseated position relative to valve seat 12, thereby venting brake pipe 6 to atmosphere via pressure chamber 4, connecting port 17, exhaust chamber 15, exhaust port 13, and exhaust passageway 16.

A conventional electro-magnet valve device 22 is mounted on housing portion 1 and comprises an electrical energizing circuit 23 by which a magnet 24 is normally maintained in a magnetized state for normally retaining a valve member 25, against the opposing force of a spring 26, in a closed or seated position relative to a valve seat 27 whereby chamber 4 and, therefore, brake pipe 6 are cut off from atmosphere via a communication comprising a connecting passageway 28 between said pressure chamber and the magnet valve device, and an atmosphereic port 29 formed in the magnet valve device. When magnet 24 is deenergized, spring 26 operates valve member 25 to an open or unseated position relative to valve seat 27, whereby brake pipe 6 is vented to atmosphere via chamber 4, connecting passageway 28, past unseated valve 25 and via atmospheric port 29.

In operation, assuming that brake pipe 6 extends throughout the length of a rapid transit train and that each car of said train is equipped with an emergency brake valve device as shown in FIG. 1, when the operator desires to initiate or effect a brake application, he causes, in conventional manner, a pressure reduction to take place in said brake pipe, which normally is charged at a certain pressure effective for retaining the brakes in a released state. The degree or rate of brake pipe pressure reduction is determined by the type of application initiated, that is, either a service application or an emergency application.

As is well known to those skilled in the art and, therefore, not deemed necessary to be described in detail herein for understanding the invention, it will suffice to say that brake pipe pressure reduction for effecting a service application occurs at a lesser rate than that required for an emergency application. Consequently, choke 7 which communicates pressure chamber 4 with equalizing chamber 5, is preselected with such a flow capacity that a brake pipe pressure reduction (and therefore in said pressure chamber also) for initiating a service application can be accommodated by said choke in maintaining substantial pressure equalization between the two chambers and, therefore, on opposite sides of piston 3. Piston 3, therefore, remains in its normal position during a service brake application.

On the other hand, if a brake pipe pressure reduction is effected at an emergency rate for an emergency application, the flow rate capacity of choke 7 is restrictive enough to establish a pressure differential between chambers 4 and 5, and therefore across piston 3, sufficient for said piston to overcome resistance of spring 21 and move downwardly, as viewed in the drawing, to cause finger 20 to engage and move valve member 8 and valve 10 off seat 12. With valve 10 in its open or unseated position, reduction of pressure in brake pipe 6 is assisted by venting such pressure via pressure chamber 4, exhaust chamber 15, exhaust port 13, and exhaust passageway 16, thereby speeding up brake pipe pressure reduction in each succeeding car of the train for propogating the emergency application therethrough.

By providing the magnet valve device 22, an emergency brake application may be initiated electrically either as an alternative to the conventional fluid pressure initiated application or as a safety measure in the event of a braking apart of the train.

As was hereinbefore noted, circuit 23 is normally closed or energized for maintaining magnet 24 energized and, therefore, valve member 25 in its closed position. Circuit 23 is a continuous circuit extending throughout the entire length of the train, and, therefore, under normal circumstances an emergency brake application is preferably effected electrically because all magnet devices 22 on the respective cars of the train can be deenergized simultaneously for effecting simultaneous brake application on all cars, or at the same time as compared to propogation of the application on the cars in succession when application is initiated by fluid pressure control. Thus, if the operator opens circuit 23, magnet 24 of the magnet valve device 22 on each car is deenergized. Spring 26 is rendered effective for operating valve member 25 to its open position for venting brake pipe 6 at an emergency rate via the communication hereinbefore defined. At the same time, a sufficient differential is established across piston 3 for causing vent valve 8 to be operated to its vent position, as above described, for assisting in the venting of brake pipe 6.

Figure 2:
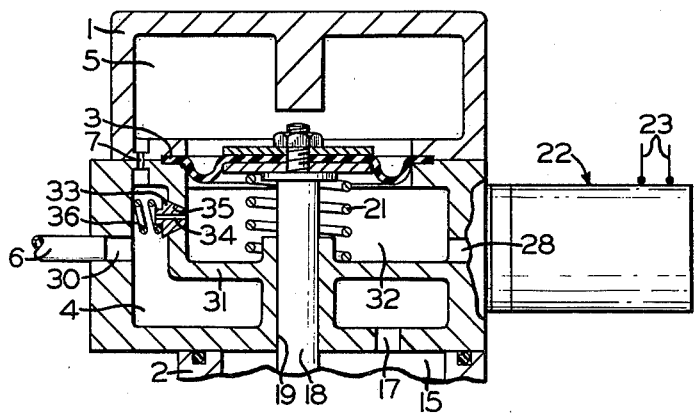
FIG. 2 is a fragmentary portion, in section, of a modification of the valve device shown in FIG. 1.

If it is feared that venting of fluid pressure from brake pipe pressure chamber 4 by deenergization of magnet valve 22 may occur at a rate less than an emergency rate because of the relative flow capacities of atmospheric port 29 of said magnet valve device and an inlet port 30 by which brake pipe 6 is connected to said pressure chamber, the vent valve device may be modified in the manner shown in FIG. 2 of the drawing. The over-all volume of brake pipe 6, which has to be evacuated during an emergency brake application, is quite large compared to the volume of brake pipe pressure chamber 4, the inflow of pressure from the brake pipe into said chamber may occur at a rate much greater than that at which the chamber can be evacuated through port 29, therefore impeding establishment of the pressure differential across piston 3 at the desired or emergency rate.

As shown in FIG. 2, a portion of brake pipe pressure chamber 4 is isolated from said chamber by an isolating wall 31 to form an actuating chamber 32 adjacent the lower side of piston 3 or opposite the side adjacent equalizing chamber 5. Actuating chamber 32, which is a much smaller volume relative to brake pipe 6, is communicated with brake pipe pressure chamber 4 via a one-way check valve 33 having a choke or restricted passageway 34 extending axially therethrough. Flow from brake pipe pressure chamber 4 to actuating chamber 32 occurs at a restricted rate via choke 34, whereas reverse flow from said actuating chamber to said pressure chamber may occur substantially unrestrictedly by unseating of check valve 33 from a valve seat 35 against the opposing force of a relatively weak spring 36. When brake pipe 6 is being charged, along with pressure chamber 4, pressure in both chambers 5 and 32 are eventually equalized with that in said pressure chamber via chokes 7 and 34, respectively.

When magnet valve 22 is deenergized for initiating an emergency application, actuating chamber 32 is evacuated via port 28, unseated valve 25 and port 29. Since pressure from pressure chamber 4 and, therefore, from brake pipe 6, is prevented from flowing into actuating chamber 32, except by way of choke 34, a pressure differential is immediately established across the opposite sides of piston 3, which, in the manner above described, operates valve member 8 to its vent position for venting brake pipe 6 at an emergency rate.

In the event the train should break apart, the continuity of circuit 23 would be broken also to therefore cause deenergization of the magnet valve devices 22 and thereby effect an emergency application as though the operator effected such deenergization of the circuit.

Figure 3:
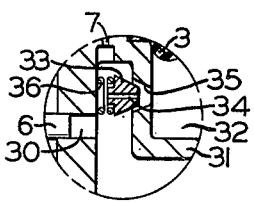
FIG. 3 is an isolated view, in section and on a slightly larger scale, of the modification shown in FIG. 2.

If an emergency application is initiated by use of fluid pressure control (if for some malfunction the operator could not open or deenergize circuit 23), it is still necessary to establish a pressure differential across piston 3 in order for said piston to move downwardly for opening vent valve 8. When pressure in brake pipe 6 and, therefore, in brake pipe pressure chamber 4 is vented at an emergency rate, fluid pressure in actuating chamber 23 (which had built up to that prevailing in said pressure chamber prior to the emergency reduction) causes check valve 33 to be operated to an open or unseated position relative to valve seat 35, as shown in FIG. 3. Pressure bottled up in actuating chamber 32 is thereby vented past open check valve 33 into pressure chamber 4 (now at a much reduced pressure) with the resulting differential across piston 3 and downward movement thereof causing vent valve 8 to be opened, as above described.

Figure 4:
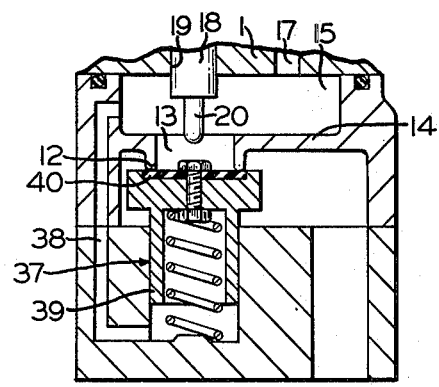
FIG. 4 is a fragmentary portion, in section, of a further modification of the valve device shown in FIG. 1.

If it is desired to make vent valve 8 less resistant to opening thereof by piston 3 (acting through stem 18 and finger 20) and thereby, in effect, render said piston more sensitively responsive to a pressure differential thereacross, a modified or pressure-balanced vent valve member 37, as shown in FIG. 4, may be provided in place of vent valve 8 shown in FIG. 1.

Vent valve 37 is provided with equal pressure areas at opposite ends thereof, the upper area being open to pressure in chamber 15 via exhaust port 13 while the lower pressure area is subjected to the same pressure via a passageway 38 communicating with chamber 15. Since the pressures acting on both ends of vent valve 37 are equal, only a relatively light spring 39 is required for keeping a valve element 40 of said vent valve in a closed or seated position on valve seat 12. Piston 3, therefore, when moving downwardly for unseating valve 40 from valve seat 12, encounters very little resistance from the relatively light spring 39.

Having now described the invention what I claim as new and desire to secure by Letters Patent, is:

1. An emergency vent valve device for a railway vehicle in a train having a brake pipe normally charged with fluid at a certain pressure and effective upon reduction of fluid pressure therein for initiating a brake application on the train, said emergency brake valve device comprising:
   a. a casing having formed therein a first chamber connected to brake pipe pressure via a first choke, a second chamber connected to said brake pipe pressure via a second choke, and a third chamber open directly to the brake pipe and communicating with said first and second chambers via said first and second chokes, respectively, said brake pipe being communicable to atmosphere via said third chamber;
   b. vent valve means operably interposed between said third chamber and atmosphere, said vent valve means being effective in a normally closed position for cutting off said third chamber and the brake pipe from atmosphere and being operable to an open position for opening said third chamber and, therefore, the brake pipe to atmosphere;
   c. piston means operably disposed between and separating said first and second chambers and subjectable on opposite sides thereof to fluid pressure prevailing in said first and second chambers, respectively;
   d. said piston means normally occupying a retracted position out of contact with said vent valve means in which said vent valve means assumes said closed position, and being operable, in response to a pressure differential established thereacross by a pressure reduction in said second chamber or said third chamber at a rate in excess of said preselected flow rate, to an extended position for operating said vent valve means to said open position; and
   e. a one-way check valve interposed between said second chamber and said third chamber, the direction of flow being from said second chamber to said third chamber upon reduction of pressure in said third chamber to a degree less than that prevailing in said second chamber.

2. An emergency vent valve device, as set forth in claim 9, further characterized by actuating means for arbitrarily effecting a reduction of pressure in said second chamber independently of brake pipe pressure reduction, at a rate in excess of said preselected flow rate.

3. An emergency vent valve device, as set forth in claim 2, wherein said actuating means comprises:
   a. a valve member interposed in a communication between said second chamber and atmosphere and normally occupying a closed position in which said communication is interrupted;
   b. electro-magnet means normally energized for maintaining said valve member in its said closed position; and
   c. biasing means for operating said valve member to an open position in which said communication is opened upon arbitrary deenergization of the electro-magnet means.

4. An emergency vent valve device, as set forth in claim 3, further characterized by an electrical train circuit effective, when closed, for energizing said electro-magnet means and, when open, for deenergizing the electro-magnet means.

5. An emergency vent valve device, as set forth in claim 1, wherein said vent valve means comprises:
   a. a pressure-balanced vent valve member having equal pressure areas at opposite ends thereof, both areas being subjected to the pressure prevailing in said third chamber via a passageway interconnecting the two pressure areas with said third chamber; and
   b. a spring for urging said vent valve member toward its said closed position.

* * * * *

UNITED STATES PATENT AND TRADEMARK OFFICE
CERTIFICATE OF CORRECTION

PATENT NO. : 4,037,880
DATED : July 26, 1977
INVENTOR(S) : Robert J. Bridigum

It is certified that error appears in the above-identified patent and that said Letters Patent are hereby corrected as shown below:

Column 6, line 10, "9" should be --1--

Signed and Sealed this

Sixth Day of December 1977

[SEAL]

Attest:

RUTH C. MASON
Attesting Officer

LUTRELLE F. PARKER
Acting Commissioner of Patents and Trademarks